United States Patent [19]

Straub et al.

[11] Patent Number: 5,494,097
[45] Date of Patent: Feb. 27, 1996

[54] METHOD AND DEVICE FOR REGULATING OR CONTROLLING THE TEMPERATURE OF AN INTERIOR SPACE, ESPECIALLY THAT OF A MOTOR VEHICLE

[75] Inventors: Wolfgang Straub, Deggingen; Dieter Heinle, Pluederhausen, both of Germany

[73] Assignee: Mercedes-Benz AG, Stuttgart, Germany

[21] Appl. No.: 314,490

[22] Filed: Sep. 27, 1994

[30] Foreign Application Priority Data

Sep. 27, 1993 [DE] Germany .......... 43 32 846.6

[51] Int. Cl.$^6$ .............. B60H 1/32; B60H 1/00; F24D 11/10; F24F 11/00
[52] U.S. Cl. .............. 165/1; 165/11.1; 62/131; 62/126; 62/244; 236/91 E; 236/91 F; 236/DIG. 2; 237/12.3 B; 237/2 A
[58] Field of Search .............. 62/126, 131, 244; 165/11.1, 42, 43, 1, 12; 237/12.3 A, 12.3 B, 2 A; 236/91 E, 91 F, DIG. 2

[56] References Cited

U.S. PATENT DOCUMENTS

| 4,432,210 | 2/1984 | Saito | 62/126 |
| 4,821,528 | 4/1989 | Tershak | 62/126 |
| 5,003,785 | 4/1991 | Petri et al. | 62/131 |
| 5,123,252 | 6/1992 | Hanson | 62/126 |

FOREIGN PATENT DOCUMENTS

| 0375871 | 1/1992 | European Pat. Off. . |
| 4123882 | 1/1993 | Germany . |

Primary Examiner—John K. Ford
Attorney, Agent, or Firm—Evenson, McKeown Edwards & Lenahan

[57] ABSTRACT

A method and device is provided for regulating or controlling the temperature of an interior, especially for a motor vehicle. An interior temperature regulation mode is provided if an interior temperature sensor and a blowing-out temperature sensor have been connected such that they can operate. A blowing-out temperature regulation mode is provided if only the blowing-out temperature sensor has been connected such that it can operate. Or, a reversionary control mode is provided if no temperature sensor which can operate is present, for which purpose a control and regulating device is correspondingly configured. The control and regulating device can be used for various types of vehicles. A blowing-out temperature regulation mode is also implemented if an open roof is identified in the case of a convertible vehicle.

15 Claims, 2 Drawing Sheets

METHOD AND DEVICE FOR REGULATING OR CONTROLLING THE TEMPERATURE OF AN INTERIOR SPACE, ESPECIALLY THAT OF A MOTOR VEHICLE

BACKGROUND AND SUMMARY OF THE INVENTION

The invention relates to a method for regulating or controlling the temperature of an interior space, especially that of a motor vehicle, by setting the temperature of a medium. The medium flows out of an actuating device and acts thermally on the interior space. The temperature of the medium is set using a control and regulating device as a function thereof, via signals which can be supplied to an interior temperature sensor input connection, an outlet-flow temperature sensor input connection and one user setting variable input connection. The invention further relates to a device which is suitable for carrying out the method.

Methods of the above-described type are known, for example, for heating or air-conditioning systems in motor vehicles. Air, which is supplied from the exterior to a heat exchanger, which forms a part of the actuating device, and is blown out from there into the vehicle interior, forms the medium which acts thermally on the interior space, and at the same time also forms the interior medium itself.

German Patent document DE 41 23 882 A1 discloses a heating system for the interior of a motor vehicle. The heating system operates in an interior temperature regulation mode, in such a manner that a required interior temperature which is desired by the user can be preset as the control variable of an outer control loop whose setting variable is the blowing-out temperature of the air. The setting variable acts as a control variable on an inner control loop which regulates the blow-out air temperature in a corresponding manner.

Such known interior temperature regulation frequently can no longer be sensibly carried out in a vehicle if bodywork openings in the vehicle are open and the vehicle interior is, as a consequence, subjected to an exchange of air with the exterior atmosphere over a large area. This applies in particular to vehicles having a roof which can be optionally opened or closed, for example, in the case of a convertible. For this reason, a vehicle air-conditioning system, such as is disclosed in European Patent document EP 0 375 871 B1 (U.S. Pat. No. 5,003,785), provides a switching device which detects the state of the vehicle's bodywork interior opening. If an opening of the bodywork opening is detected, the switching device switches over from internal temperature control, in the case of which the required setting of a temperature mixing valve is set as a function of the actual interior temperature, the required interior temperature and the actual blown-out air temperature, to a blowing-out temperature control. In the blowing-out temperature control, the required setting of the temperature mixing valve is now set only as a function of the required interior temperature and of the actual blow-out air temperature.

The present invention is based on the technical problem of providing a method and a device of the above-mentioned type for regulating or controlling the temperature of an interior such that, using the method and device, an interior temperature setting is possible in a manner that matches as well as is possible with the respective situation, both when an interior temperature sensor and an outlet flow temperature sensor are present and in the absence of one of the two sensors, or both sensors, and which are particularly suitable for vehicles whose roof can be optionally opened and closed.

The present invention overcomes this problem by providing a method for regulating or controlling the temperature of an interior space, especially for a motor vehicle, by setting the temperature of a medium, which flows out of an actuating device and acts thermally on the interior, via a control and regulating device as a function thereof, using signals which can be supplied to an interior temperature sensor input connection, an outlet-flow temperature sensor input connection and at least one user setting variable input connection. The signals to the temperature sensor input connections are evaluated by the control and regulating device in order to identify whether the associated temperature sensors have been connected such that they can operate. Optionally, depending on this, an interior temperature-regulation mode in which the variable set by the user is treated as the required interior temperature value and the outlet-flow temperature is regulated by means of a required out flow temperature value, which is dependent on the interior temperature regulation difference, if both an interior temperature sensor, connected such that it can operate, and an outlet-flow temperature sensor, connected such that it can operate, have been identified. Alternatively, an outlet-flow temperature regulation mode in which the variable set by the user is treated as the required outlet-flow temperature value and the outlet-flow temperature is regulated as a function of this required value, if an interior temperature sensor, connected such that it cannot operate, and an outlet-flow temperature sensor, connected such that it can operate, have been identified. Or, a reversionary control mode is activated, in which the variable set by the user is treated directly as the setting variable for the actuating device, and the actuating device is set in a corresponding manner, if both an interior temperature sensor, connected such that it cannot operate, and an outlet-flow temperature sensor, connected such that it cannot operate, have been identified.

A device operating in accordance with the method includes a control and regulating device, at least one user-controllable setting device, whose output connection is connected to a user setting variable input connection of the control and regulating device, an interior temperature sensor and an outlet flow temperature sensor, whose outputs are connected to respective input connections of the control and regulating device, and an actuating device, which is controlled by the control and regulating device for the outlet flow of the medium, which is at the outlet-flow temperature, into the interior space. The control and regulating device, for each input connection for a temperature sensor, confirms whether the temperature sensor is connected to the relevant input connection such that it can operate. The control and regulating device implements the interior temperature regulation mode, the outlet-flow temperature regulation mode and the reversionary control mode. The control and regulating device also includes a switching device, to which the output signals of the sensor connection confirmation system are supplied and which, as a function of this, activate the internal temperature regulation mode, the outlet-flow temperature regulation mode or the reversionary control mode.

The control and regulating device is constructed such that it identifies which temperature sensors are connected such that they can operate, and selects the suitable operating mode for interior temperature setting accordingly. This makes possible a sensible interior temperature setting mode by controlling or regulating using the same control and regulating device in each case if one of the two, or even both, temperature sensors is or are in a condition such that it or they cannot operate. The particular means required for this purpose, via which the control and regulating device operates, are individually familiar to one of ordinary skill in the art and can be implemented in hardware terms as corresponding electrical modules or even, at least partially, in software terms in conjunction with a microprocessor.

In one embodiment of the present invention, it is sufficient to provide a single user-operable setting device for all three intended operating modes. The control and regulating device interprets the value set by the user in a respectively appropriate manner for the present operating mode. A further embodiment provides a preferred simple and user-friendly arrangement.

In a further embodiment of the present invention, the temperature sensors are configured as temperature-dependent resistors which are in each case supplemented in the control and regulating device to form a voltage divider as means for confirming the connection of a sensor which is capable of operation. This is because the voltage divider provides a voltage signal which is characteristic of the respective state and can be evaluated in a corresponding manner by the control and regulating device in each case for a connection which is not connected, a connection which is short-circuited, and a correct sensor connection.

In the case of an advantageous further embodiment of the invention, a device which is suitable for installation in a motor vehicle and has a bodywork opening which can open, for example having a roof which can open, has a bodywork opening position identification switch whose state is detected by the control and regulating device. The device activates the blowing-out temperature regulation mode on identification of an at least partially open bodywork open position, and in this manner prevents an interior temperature regulation mode being carried out, which would no longer be expedient in this case.

The identification switch is preferably looped into the connection circuit for the interior temperature sensor so that, if a bodywork opening is open, this connection circuit is interrupted and an interior temperature sensor, which is connected such that it cannot operate, is thus simulated. As a result of which, the control and regulating device activates the outlet-flow temperature regulation mode, without requiring an additional signal input for the identification switch.

Other objects, advantages and novel features of the present invention will become apparent from the following detailed description of the invention when considered in conjunction with the accompanying drawings.

DETAILED DESCRIPTION OF THE DRAWINGS

Figure 1:
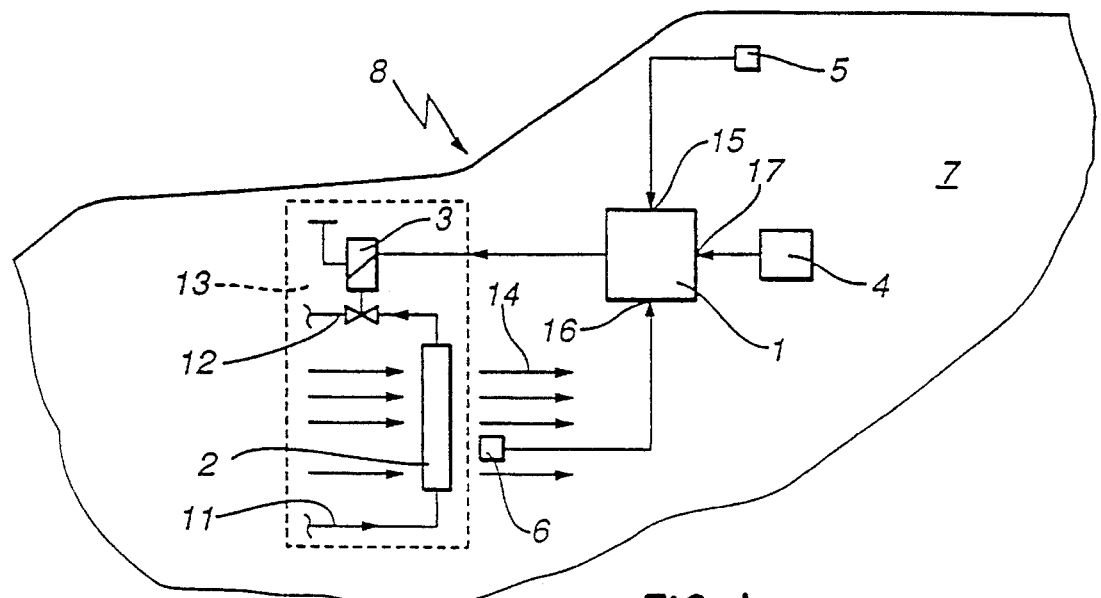
FIG. 1 is a schematic block diagram of a motor vehicle heating system.

FIG. 1 schematically indicates a motor vehicle 8, specifically a convertible, which has a heating system for setting the temperature of the associated vehicle interior 7. The heating system contains the following elements: a central control and regulating device 1; a user-operable setting device 4 whose output signal acts on an associated input 17 of the control and regulating device 1; an interior temperature sensor 5 and an outlet-flow temperature sensor 6 which are connected to respective inputs 15, 16 of the control and regulating device 1; and an actuating device 13 to which the control and regulating device 1 applies an actuating signal. The actuating signal is formed as a function of its input signals. The situating device 13 contains a heat exchanger 2 with a hot-water inlet line 11 and a hot-water return line 12. A solenoid valve 3 functions as an actuating element. The solenoid valve 3 operates on the return line 12 such that it controls the flow and can be driven in a pulsed, pulse-width-modulated manner by the control and regulating device 1. The heat exchanger 2, which implements regulation on the water side, brings air 14 flowing in from the exterior to a specific blowing-out temperature which can be detected by the blowing-out temperature sensor 6, after which the air is blown out of the heat exchanger 2 and into the vehicle interior 7.

Figure 2:
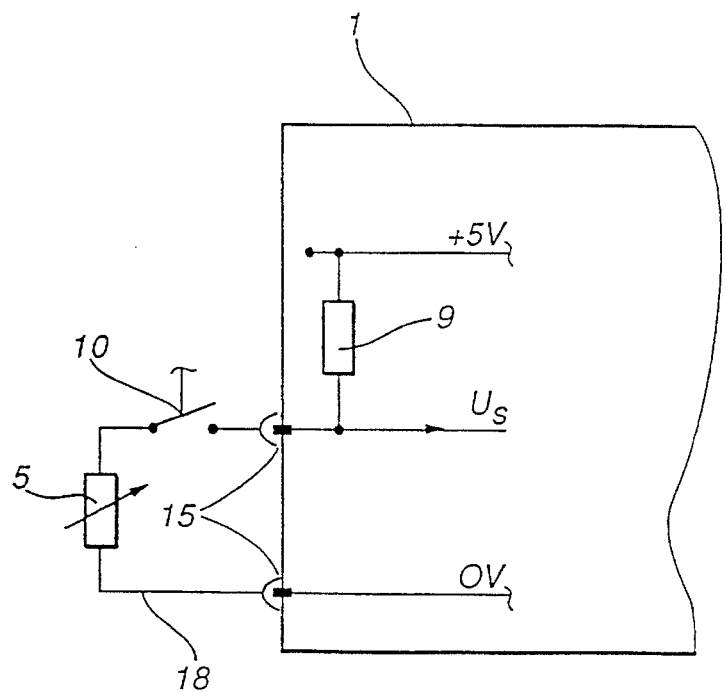
FIG. 2 is a detailed schematic circuit diagram with an interior temperature sensor, which is shown in FIG. 1, and with the associated connection region of a control and regulating device, likewise shown in FIG. 1.

The control and regulating device 1 is set up to carry out three different operating modes to influence the internal temperature depending on whether both temperature sensors 5, 6, one of them, or neither of the two, is connected, such that it or they can operate, to signal the control and regulating device 1. In order to identify this, the control and regulating device 1 has on each associated connection 15, 16 for a temperature sensor 5, 6 a voltage divider arrangement which is illustrated in FIG. 2 in a representative manner using the example of the interior temperature sensor 5. The interior temperature sensors 5, 6 are in this case designed as temperature-dependent electrical resistors which can be connected via a connecting lead 18 to the associated two-pole input 15, 16 of the control and regulating device 1. In the interior of the control and regulating device 1, one of these connections is set to a voltage of O V, while the other connection is connected to one connection of a resistor 9 within the control and regulating device 1. The other connection of the resistor 9 has a +5 V supply voltage applied. The resistor 9 together with the temperature-dependent sensor resistor 5, 6 forms a voltage divider whose center tap, which is connected to the second input connecting pole, provides the signal voltage $U_s$ which is supplied for the purpose of evaluation to the subsequent switching means, which are not shown explicitly, in the control and regulating device 1.

If the respective temperature sensor 5, 6 has not been connected, the signal voltage $U_s$ is +5 V while, in contrast, for example because of a defect, a sensor connecting lead 18 is short-circuited, the sensor voltage $U_s$ is O V. If a temperature sensor 5, 6 is present which is connected such that it can operate, this voltage $U_s$ has a value between O V and +5 V. The signal voltage $U_s$ is thus characteristic of the connection state of the associated temperature sensor 5, 6 and is therefore used by the subsequent switching means, which are not shown. The switching means can be, for example, an integrated part of a microcomputer of the control and regulating device 1. The signal voltage $U_s$ is for the purpose of activating the desired operating mode from the three possible operating modes, which will be described in detail below.

If the switching means of the control and regulating device 1 identifies that both temperature sensors 5, 6 have been connected such that they can operate, an internal temperature regulation mode is activated. In this operating mode, a required blowing-out temperature value $Tb_{soll}$ is defined by an outer control loop as a function of the interior temperature regulation difference $Ti-Ti_{soll}$. This value $Tb_{soll}$ is supplied as a control variable to an inner control loop which in turn uses it to regulate the blowing-out temperature Tb in a corresponding manner. Such interior temperature regulation is disclosed, for example, in German Patent document DE 41 23 882 A1 to which reference should be made for further details in this respect.

In this case, the user sets a desired required interior temperature value $Ti_{soll}$ on the setting device 4. The control and regulating device 1 contains allocation means in a manner which is likewise not shown explicitly, for example once again as an integrated part of a micro processor. The allocation means evaluates the setting implemented on the setting device 4 in a manner specific to the operating mode, so that the user can implement the setting on this single setting device 4 for any operating mode. Thus, a plurality of setting devices, for example, are not necessary. The setting range of the setting device is intended to be designated by the interval $[x_{min}, x_{max}]$. Specifically, in the interior temperature regulation mode, the allocation device allocates to this setting device adjustment range $[x_{min}, x_{max}]$ a specific required interior temperature value range $[Ti_{min}, Ti_{max}]$ in a linear manner, that is to say the relationship $$Ti_{soll} = Ti_{min} + (Ti_{max} - Ti_{min})(x - x_{min})/(x_{max} - x_{min})$$

applies between the setting device setting (x) and the desired required interior temperature value $Ti_{soll}$. For example, if a minimal required interior temperature value of $Ti_{min} = 14°$ C. is allocated to the lower setting device end stop $(x_{min})$, and a maximum required interior temperature value of $Ti_{max} = 34°$ C. to the upper setting device end stop $(x_{max})$, then the center position $(x_M)$ of the user-operable setting device corresponds to a required interior temperature value of 24° C. This situation is illustrated on the left-hand ordinate of the diagram in FIG. 3.

In this manner, the user can set a desired interior temperature Ti in the range between 14° C. and 34° C. on the setting device 4 in the interior temperature regulation mode, whose regulation is then provided by the control and regulating device 1 by correspondingly controlling the actuating device 13 by using the signals from the interior temperature sensor 5 and from the blowing-out temperature sensor 6. It is self-evident that the matching of the setting range of the setting device 4 to the required interior temperature value range, which is preferably carried out in software within a microprocessor in the control and regulating device 1, need not always follow the linear course described above. Rather, any desired functional dependency of the required interior temperature value $Ti_{soll}$ on the setting device position (x) which is favorable to the respective requirement can be preset, which can be implemented very easily in software.

If the interior temperature sensor 5 has been connected to the control and regulating device 1 such that it cannot operate, for example, because there is a short-circuit in the connecting lead 18 or in the vehicle 8 in which the heating system is installed, no such interior temperature sensor is provided. Therefore, although the above interior temperature regulation mode cannot be carried out due to the lack of information on the respective actual interior temperature value Ti, the heating system shown nevertheless even in this case allows the temperature in the vehicle interior to be influenced in a sensible manner. It also allows it to be precise by means of blowing-out temperature regulation, subject to the precondition that the blowing-out temperature sensor 6 has been connected so that it can operate.

The connection of the blowing-out temperature sensor 6 such that it can operate is identified on the basis of the presence of a voltage value between 0 V and +5 V at the signal output of the voltage divider which is allocated to the blowing out temperature sensor 6. In an analogous manner, the voltage divider at the input 15 of the control and regulating device 1 for the interior temperature sensor 5 in this case emits a voltage signal of $U_s = +5$ V if the sensor 5 is not connected, or $U_s = 0$ V if the connecting lead 18 is short-circuited.

The two voltage signals $U_s$ of the voltage dividers are evaluated by the switching device in the control and regulating device 1. The switching device then switches over to the blowing-out temperature regulation mode provided for this case, in that they activate the device provided for this purpose for carrying out the blowing-out temperature mode within the control and regulating device 1. In this operating mode, the blowing-out temperature Tb is regulated by the control and regulating device 1 using the information on the respective actual blowing-out temperature value from the blowing-out temperature sensor 6 instead of a required blowing-out temperature value $Tb_{soll}$ preset by the user. To this end, the control and regulating device 1 carries out a normal regulation method which does not need any more detailed explanation here. The user presets the desired required blowing-out temperature value $Tb_{soll}$ using the same control element of the setting device 4 that he uses when he sets the desired required interior temperature value $Ti_{soll}$ in the case of the interior temperature regulation mode. For this purpose, the control and regulating device 1 reinterprets the setting of the setting device 4 in a manner which is suitable for switching over from the interior temperature regulation mode. It does this by matching the setting range $[x_{min}, x_{max}]$ of the setting device 4 to a blowing-out temperature regulation range $[Tb_{min}, Tb_{max}]$, which can be preset, in the same manner linearly as is described above for the internal temperature Ti. In order to not have to refer back to the setting (x) of the setting device 4 itself once again, the control and regulating device 4 in this case uses the relationship mentioned above, which has already been preset for the interior temperature regulation mode, between the setting device setting (x) and the required interior temperature value $Ti_{soll}$. Therefore, the relationship $$Tb_{soll} = Tb_{min} + (Ti_{soll} - Ti_{min})(Tb_{max} - Tb_{min})/Ti_{max} - Ti_{min})$$

is produced for a specific setting value $Tb_{soll}$ of the blowing-out temperature as a function of a corresponding setting value $Ti_{soll}$ of the interior temperature in the interior temperature regulation mode for the same setting device setting (x). For example, the relationship follows $Tb_{soll} = 4(Ti_{soll} - 14°$ C.) using the above values $Ti_{min} = 14°$ C. and $Ti_{max} = 34°$ C., as well as preset maximum and minimum required blowing-out temperature values of $Tb_{min} = 0°$ C. and $Tb_{max} = 80°$ C., respectively.

Figure 3:
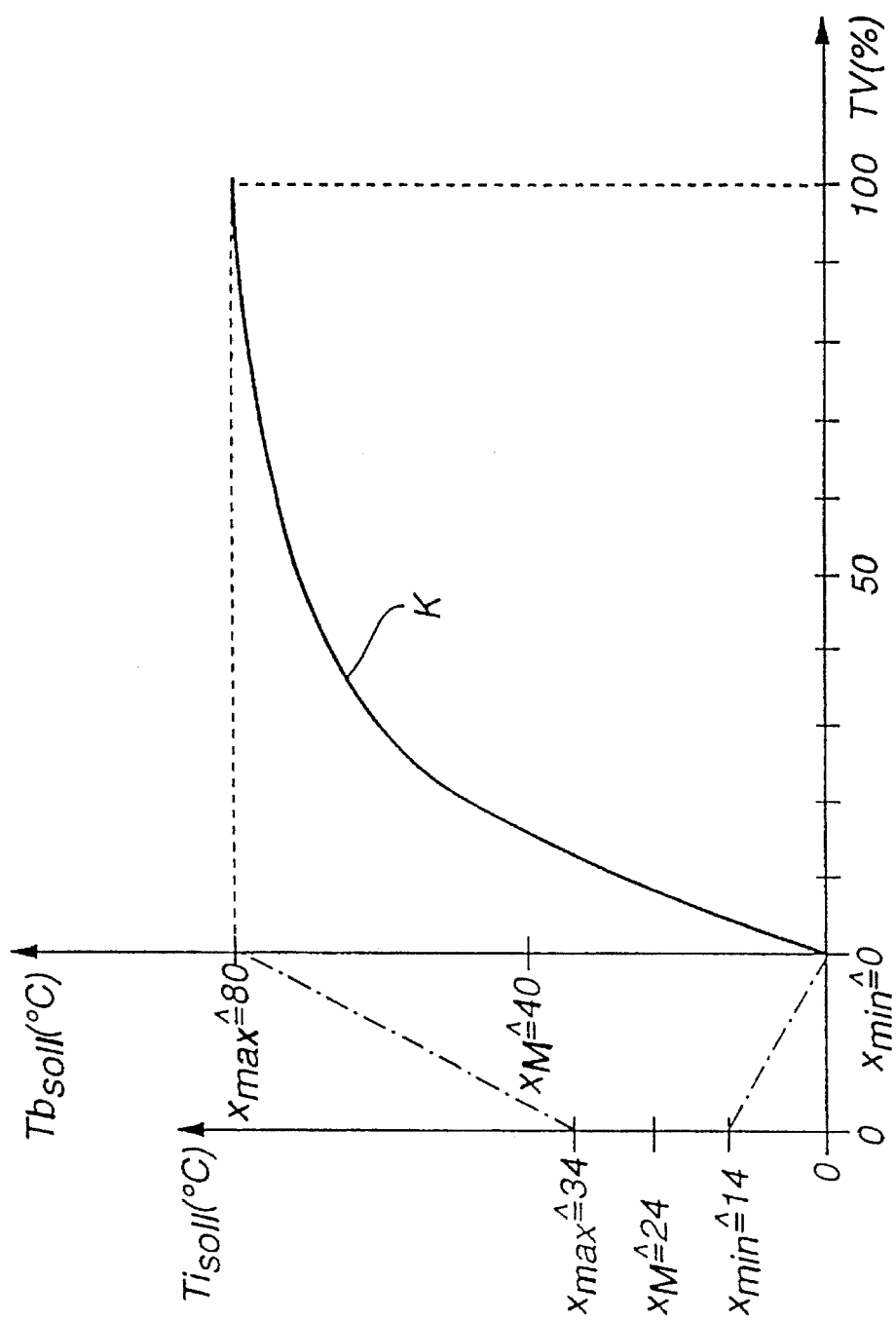
FIG. 3 is a graphical illustration of the value-range allocations for a user-operable setting device, which is shown in FIG. 1, for various operating modes.

This spreading of the interior temperature scale in the case of the interior temperature regulation mode to the blowing-out temperature scale in the case of the blowing-out temperature regulation mode is illustrated by the dashed-dotted lines in the diagram in FIG. 3. The right-hand ordinate of this diagram shows the assignment of the setting device scale to the blowing-out temperature range from 0° C. to 80° C.

Even in the cases in which interior temperature regulation is not possible, the user can in this manner influence the interior temperature by setting a desired blowing-out temperature on the setting device 4 for the air 14 flowing out of the heat exchanger 2 of the actuating device 13 into the vehicle interior 7. It is, of course, also possible for this operating mode to preset a linear allocation which differs from that described above between the setting range $[x_{min}, x_{max}]$ of the setting device 4 and the required blowing-out temperature value range [$Tb_{min}$, $Tb_{max}$] which can be set in a desired manner.

Such blowing-out temperature regulation is also favorable for the case in which a vehicle bodywork opening, in this case the roof of a convertible, is not closed, but rather is open. This is because, in this case, as a result of the large-area air inter change with the atmosphere, regulation to a specific interior temperature is generally not possible or sensible. Instead of this, it is desired for the user to be able to preset the temperature of the air 14 flowing into the interior 7 from the heat exchanger 2. This is achieved in a particularly simple manner in the present example in that a roof position identification switch 10 is looped into the connecting lead 18 for the interior temperature sensor 5, as is illustrated in FIG. 2. When the roof is closed, this switch 10 is closed and has no further influence in the regulation or control operation of the heating system. If the roof is opened, then the switch 10 is also opened, as a result of which the connecting lead 18 for the interior temperature sensor 5 is interrupted, so that an interior temperature sensor 5 which is not capable of operation is simulated at the associated input 15 of the control and regulating device 1. This leads to the control and regulating device (1) switching to blowing out temperature regulation mode when the roof is open even when an interior temperature sensor 5 which is intrinsically capable of operation is present. Using this arrangement of the roof position identification switch 10, no further components are required to activate the blowing-out temperature regulation mode when the roof is open.

Alternatively, if insertion of the roof position identification switch 10 into the interior temperature sensor connecting lead 18 is not expedient, it is possible to provide a dedicated roof position identification lead for the roof position identification switch 10 and an additional digital input to the control and regulating device 1. Via this digital input, the control and regulating device 1 then detects the state of the roof position identification switch 10. This digital input can remain unused when used in the heating system in vehicles having a roof which cannot open.

Finally, the heating system according to FIG. 1 additionally makes possible a reversionary control mode, in a third operating mode. This is implemented if the control and regulating device 1 identifies, via its corresponding inputs 15, 16, that neither the interior temperature sensor 5 nor the blowing-out temperature sensor 6 has been connected such that it can operate. Due to the lack of information on the respective actual blowing-out temperature value from the blowing-out temperature sensor 6, it is no longer possible to regulate the blowing-out temperature Tb by means of the control and regulating device 1. Nevertheless, the heating system allows the user to influence the interior temperature within the reversionary control mode, in which the user, to be precise once again via the setting (x) on the setting device 4, directly determines the setting of the setting device 13. Specifically, the duty ratio TV for the solenoid valve 3 is set. To this end, the control and regulating device 1 in this case allocates the setting range [$x_{min}$, $x_{max}$] of the actuating device 4 directly to the characteristic K of the solenoid valve drive 3, which is illustrated graphically in FIG. 3.

The abscissa of FIG. 3 shows the duty ratio TV for the solenoid valve 3, a value of 0% TV corresponding to a completely closed pulsing valve 3, and a value of 100% TV corresponding to a completely open pulsing valve 3. The non-linear solenoid valve characteristic K is applied directly to the actuating device setting range [$x_{min}$, $x_{max}$] so that, for example, the center position ($x_M$) of the setting device 4 corresponds to a duty ratio of approximately 15%. As an alternative, it is of course possible to modify the matching of the solenoid valve actuating range to the setting device setting range via the control and regulating device 1 so as to produce a linear functional dependency, or a different desired functional dependency, between the solenoid valve duty ratio TV and the setting device setting (x).

As a result of the provision of this reversionary control mode, the user is therefore able to influence the vehicle interior temperature even when both the interior temperature sensor 5 and the blowing-out temperature sensor 6 are not present or, in any case, have been connected such that they cannot operate. The control and regulating device 1 which identifies this state switches over to the reversionary control mode provided for this purpose, in which it interprets the setting on the setting device 4 directly as the setting of the solenoid valve 3 of the actuating device 13, and controls the solenoid valve 3 accordingly. The user can then regulate the desired blowing-out temperature Tb by detecting the instantaneous blowing-out temperature and correspondingly changing the setting on the setting device 4.

The device described above for influencing the temperature of a vehicle interior, and the method carried out by it, make it possible to influence the interior temperature in a different manner depending on which temperature sensor system is present and whether a roof which is capable of opening is open or closed. Both the interior temperature regulation mode when the existing temperature system is complete and the blowing-out temperature regulation mode when the blowing-out temperature sensor is capable of operation but the interior temperature sensor is not capable of operation, or when the vehicle roof is open, and the reversionary control mode in the event of failure of both temperature sensors, are accomplished by using the same control and regulating device. In order to carry out the various control and regulating functions, the control and regulating device contains a microprocessor, in which the required control and regulation algorithms are stored in software. As an alternative, a hardware solution is, of course, also possible which may then consist, for example, of respective units of the control and regulating device for the various operating modes. In addition, it is possible, instead of the preferred arrangement described above of only one user-operable setting device whose setting is in each case treated in an operating mode specific manner by the control and regulating device, to arrange a separate setting device for each operating mode if this appears to be more expedient for the given case, for which purpose the control and regulating device can then be provided with additional inputs. In the case of the preferred use of only one setting device, a multifunction scaling which is matched to the various setting significance is expediently provided for this setting device, for example a colored marking or numerical indications, such as a bulging, black wedge.

The present invention makes it possible to use one and the same control and regulating device universally for very different applications, for example for vehicle construction in convertibles, coupes, limousines, goods vehicles, etc. In the event of complete failure of the temperature sensor system, this control and regulating device also still allows relatively good control of the interior temperature by the user. It is possible to dispense with identification switches and detent markings on the setting device as an absolute reversionary function in the event of sensor failures. In the event of software being used for function matching of the setting device by the control and regulating device, the arrangement of a single setting device is sufficient. In addition, when used in a convertible, the control and regulating device produces the switching over from the interior temperature regulation mode to the blowing-out temperature regulation mode either by a control and regulating device input which is provided expressly for a corresponding identification switch or, in a preferred manner, by fitting the identification switch in the connection circuit for the interior temperature sensor.

It is apparent to those skilled in the art that the method according to the present invention and the device according to the invention can be used for influencing the temperature of an interior, not only in the case of the application described above in a motor vehicle heating system but also, in suitably modified form, for use in motor vehicle air conditioning systems and for other control or regulation systems which set the temperature of an interior. For example, it can be used in a building. The medium which flows in and interacts thermally with the interior need not be the interior medium itself and can possibly be, for example, heating water for a building heating system.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for regulating or controlling the temperature of an interior space, especially of a motor vehicle, by setting a temperature of a medium, said medium flowing out of an actuating device and acting thermally on the interior space, said temperature being set using a control and regulating device as a function of said setting, via signals which are supplied to an interior temperature sensor input connection, an outlet-flow temperature sensor input connection and at least one user setting variable input connection, the method comprising the steps of:

evaluating the signals to the temperature sensor input connections by the control and regulating device in order to identify whether the associated temperature sensors have been connected such that they can operate; and if both an interior temperature sensor, connected such that it can operate, and an outlet-flow temperature sensor, connected such that it can operate, have been identified, then, regulating an outlet flow temperature in an interior temperature regulation mode in which a variable set by the user is treated as a required interior temperature value via a required out flow temperature value, which is dependent on the interior temperature regulation difference; and if the interior temperature sensor, connected such that it cannot operate, and the outlet-flow temperature sensor, connected such that it can operate, have been identified, then, regulating the outlet flow temperature in an outlet-flow temperature regulation mode in which the variable set by the user is treated as the required outlet-flow temperature value as a function of this required value; and if both an interior temperature sensor, connected such that it cannot operate, and an outlet-flow temperature sensor, connected such that it cannot operate, have been identified, then, activating a reversionary control mode, in which the variable set by the user is treated directly as the setting variable for the actuating device, and said actuating device being set in a corresponding manner.

2. Device for regulating or controlling the temperature of an interior space in accordance with the method of claim 1, the device comprising:

a control and regulating device having a user setting variable input connection;

at least one user-controllable setting device having an output connection connected to the user setting variable input connection;

an interior temperature sensor and an outlet flow temperature sensor, whose outputs are connected to respective input connections of said control and regulating device; and an actuating device for providing an outlet flow of a medium, which medium is at an outlet-flow temperature, into the interior space, said actuating device being controlled by said control and regulating device;

wherein said control and regulating device comprises:

means, for each input connection of said temperature sensors, for confirming whether said temperature sensors are connected to the respective input connections such that they can operate;

means for implementing an interior temperature regulation mode, an outlet-flow temperature regulation mode and a reversionary control mode; and switching means, to which output signals of the means for confirming are supplied and which, as a function of this, activate said means for implementing said interior temperature regulation mode, said means for the outlet-flow temperature regulation mode or the means for the reversionary control mode.

3. Device according to claim 2, further comprising:

only one user-operable setting device, and wherein said control and regulating device has allocation means for allocating a setting range ($x_{min}$, $x_{max}$) of the setting device a required interior temperature value range ($Ti_{min}$, $Ti_{max}$) in the interior temperature regulation mode, a required outlet-flow temperature value range in the outlet-flow temperature regulation mode ($Tb_{min}$, $Tb_{max}$), and in the reversionary mode to the setting range (0% TV, 100% TV) of the actuating device.

4. Device according to claim 3, wherein the allocation means match the setting range of the setting device to the required interior temperature value range in a linear manner in the interior temperature regulation mode, to the required outlet-flow temperature value range in a linear manner in the outlet-flow temperature regulation mode, and directly to the actuating range characteristic (K) of the actuating device in the reversionary mode.

5. Device according to claim 2, wherein the interior temperature sensor and the outlet flow temperature sensor are configured as temperature-dependent resistors; and wherein the control and regulating device has a resistor for each sensor input connection, which resistor, together with an associated sensor resistor, forms a voltage divider whose output signal ($U_s$) represents a sensor connection state.

6. Device according to claim 3, wherein the interior temperature sensor and the outlet flow temperature sensor are configured as temperature-dependent resistors; and wherein the control and regulating device has a resistor for each sensor input connection, which resistor, together with an associated sensor resistor, forms a voltage divider whose output signal ($U_s$) represents a sensor connection state.

7. Device according to claim 4, wherein the interior temperature sensor and the outlet flow temperature sensor are configured as temperature-dependent resistors; and wherein the control and regulating device has a resistor for each sensor input connection, which resistor, together with an associated sensor resistor, forms a voltage divider whose output signal ($U_s$) represents a sensor connection state.

8. Device according to claim 2, wherein said device is installed in a motor vehicle having a bodywork opening which can open, and further comprising a bodywork opening position identification switch, whose state is detected by the control and regulating device, said control and regulating device activating a blowing-out temperature regulation mode up on identifying a bodywork opening position which is at least partially open.

9. Device according to claim 3, wherein said device is installed in a motor vehicle having a bodywork opening which can open, and further comprising a bodywork opening position identification switch, whose state is detected by the control and regulating device, said control and regulating device activating a blowing-out temperature regulation mode up on identifying a bodywork opening position which is at least partially open.

10. Device according to claim 4, wherein said device is installed in a motor vehicle having a bodywork opening which can open, and further comprising a bodywork opening position identification switch, whose state is detected by the control and regulating device, said control and regulating device activating a blowing-out temperature regulation mode up on identifying a bodywork opening position which is at least partially open.

11. Device according to claim 5, wherein said device is installed in a motor vehicle having a bodywork opening which can open, and further comprising a bodywork opening position identification switch, whose state is detected by the control and regulating device, said control and regulating device activating a blowing-out temperature regulation mode up on identifying a bodywork opening position which is at least partially open.

12. Device according to claim 8, wherein said bodywork opening position identification switch is looped into a connection circuit for the interior temperature sensor.

13. Device according to claim 9, wherein said bodywork opening position identification switch is looped into connection circuit for the interior temperature sensor.

14. Device according to claim 10, wherein said bodywork opening position identification switch is looped into a connection circuit for the interior temperature sensor.

15. Device according to claim 11, wherein said bodywork opening position identification switch is looped into a connection circuit for the interior temperature sensor.

* * * * *